(12) United States Patent
Cho et al.

(10) Patent No.: US 11,672,072 B2
(45) Date of Patent: Jun. 6, 2023

(54) SENSOR-BASED LIGHTING SYSTEM WITH INTEGRATED WIRELESS REPEATER

(71) Applicant: SIGNIFY HOLDING B.V., Eindhoven (NL)

(72) Inventors: Nam Chin Cho, Peachtree City, GA (US); Parth Joshi, Atlanta, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 78 days.

(21) Appl. No.: 17/474,111

(22) Filed: Sep. 14, 2021

(65) Prior Publication Data

US 2021/0410257 A1    Dec. 30, 2021

Related U.S. Application Data

(63) Continuation of application No. 16/362,385, filed on Mar. 22, 2019, now Pat. No. 11,147,146.

(60) Provisional application No. 62/648,654, filed on Mar. 27, 2018.

(51) Int. Cl.
*H05B 47/19* (2020.01)
*H04B 7/155* (2006.01)
*H05B 47/115* (2020.01)
*H04L 67/306* (2022.01)

(52) U.S. Cl.
CPC ............ *H05B 47/19* (2020.01); *H04B 7/155* (2013.01); *H05B 47/115* (2020.01); *H04L 67/306* (2013.01)

(58) Field of Classification Search
None
See application file for complete search history.

(56) References Cited

U.S. PATENT DOCUMENTS

| | | | |
|---|---|---|---|
| 8,934,408 B2 | 1/2015 | Deb et al. | |
| 9,659,474 B1 | 5/2017 | Kashyap et al. | |
| 9,860,961 B2 | 1/2018 | Chemel et al. | |
| 2015/0108901 A1* | 4/2015 | Greene | G08C 17/02 315/149 |
| 2015/0280936 A1* | 10/2015 | Bishop | G08C 17/02 700/275 |
| 2016/0105943 A1* | 4/2016 | Recker | H05B 45/10 315/165 |
| 2016/0116343 A1 | 4/2016 | Dixon et al. | |

FOREIGN PATENT DOCUMENTS

| | | |
|---|---|---|
| CN | 103139881 A | 6/2013 |
| CN | 103582150 A | 2/2014 |
| CN | 106900029 A | 6/2017 |
| EP | 2595456 B1 | 9/2018 |

OTHER PUBLICATIONS

International Search Report for PCT/EP2019/025077, dated Jun. 25, 2019.

* cited by examiner

*Primary Examiner* — Jany Richardson

(57) ABSTRACT

A lighting fixture that provides an illumination light includes a wireless signal repeater configured to receive an input wireless signal and to transmit an output wireless signal that corresponds to the input wireless signal. The lighting fixture further includes an occupancy sensor configured to monitor a space and to output occupancy detection information indicating whether the space is occupied. The wireless signal repeater is configured to operate based on the occupancy detection information.

20 Claims, 5 Drawing Sheets

SENSOR-BASED LIGHTING SYSTEM WITH INTEGRATED WIRELESS REPEATER

CROSS REFERENCE TO RELATED APPLICATIONS

This patent application is a Continuation of U.S. patent application Ser. No. 16/362,385, filed on Mar. 22, 2019, which claims priority to U.S. Provisional Patent Application No. 62/648,654, filed Mar. 27, 2018 and titled "Sensor-Based Lighting System With Integrated Wireless Signal Repeater," the entire contents of each are incorporated herein by reference.

TECHNICAL FIELD

The present disclosure relates generally to wireless signal repeaters that are integrated in lighting systems, in particular to wireless repeaters that are integrated in lighting systems and that operate based on detection by occupancy sensors.

BACKGROUND

In wireless networks such as Wi-Fi networks, wireless signals from network routers can often be less than optimal for some users. To illustrate, the typical omni-directional coverage provided by wireless routers (e.g., Wi-Fi network routers) may not be well suited for typical commercial and residential spaces that generally do not have a round shape. Because wireless routers are often placed close to power outlets and entry points of networks, the wireless signal coverage provided by such wireless routers is often inadequate, for example, for locations in commercial and residential buildings that are far from the routers or that are separated by a building structure that blocks or weakens wireless signals. For example, a wireless router is often located close to a network modem wall outlet that is at one end of a house/building, and the wireless signals transmitted by the wireless router often lack adequate strength for use in rooms that are far from the location of the router. Typical wireless signal repeaters that are added to expand wireless network coverage may be unsatisfactory for a number of reasons. For example, because different parts of a building or a house may suffer from inadequate wireless network coverage, typical repeaters often transmit wireless signals at high power to expand the network coverage to a general large area. Such expansions of network coverage can result in the wireless signals from the repeaters reaching areas outside of the building or the house, and thus, expose the network to security risks. Further, the continuous expansion of network coverage regardless of the presence of users some parts of the coverage areas can also expose the network to security risks. Thus, a solution that enables the expansion of wireless network coverage while minimizing security risks is desirable.

SUMMARY

The present disclosure relates generally to wireless signal repeaters that are integrated in lighting systems, in particular to wireless repeaters that are integrated in lighting systems and that operate based on detection by occupancy sensors. In some example embodiments, a lighting fixture that provides an illumination light includes a wireless signal repeater configured to receive an input wireless signal and to transmit an output wireless signal that corresponds to the input wireless signal. The lighting fixture further includes an occupancy sensor configured to monitor a space and to output occupancy detection information indicating whether the space is occupied. The wireless signal repeater is configured to operate based on the occupancy detection information.

In another example embodiment, a lighting fixture includes a light source that provides an illumination light. The lighting fixture further includes a wireless signal repeater configured to receive an input wireless signal and to transmit an output wireless signal that corresponds to the input wireless signal. The light source and the wireless signal repeater are configured to operate based on occupancy detection information from an occupancy sensor that is external to the lighting fixture. The occupancy detection information indicates whether a space monitored by the occupancy sensor is occupied.

In another example embodiment, a method of expanding a coverage of a wireless network includes receiving, by a wireless signal repeater of a lighting fixture, an input wireless signal, and transmitting, by the wireless signal repeater, an output wireless signal at a first power level if occupancy detection information from an occupancy sensor indicates that a space monitored by the occupancy sensor is occupied. The output wireless signal corresponds to the input power signal. The method further includes transmitting the output wireless signal at a second power level that is less than the first power level if the occupancy detection information from the occupancy sensor indicates that the space is unoccupied.

These and other aspects, objects, features, and embodiments will be apparent from the following description and the appended claims.

BRIEF DESCRIPTION OF THE DRAWINGS

Reference will now be made to the accompanying figures, which are not necessarily to scale, and wherein.

Figure 1:
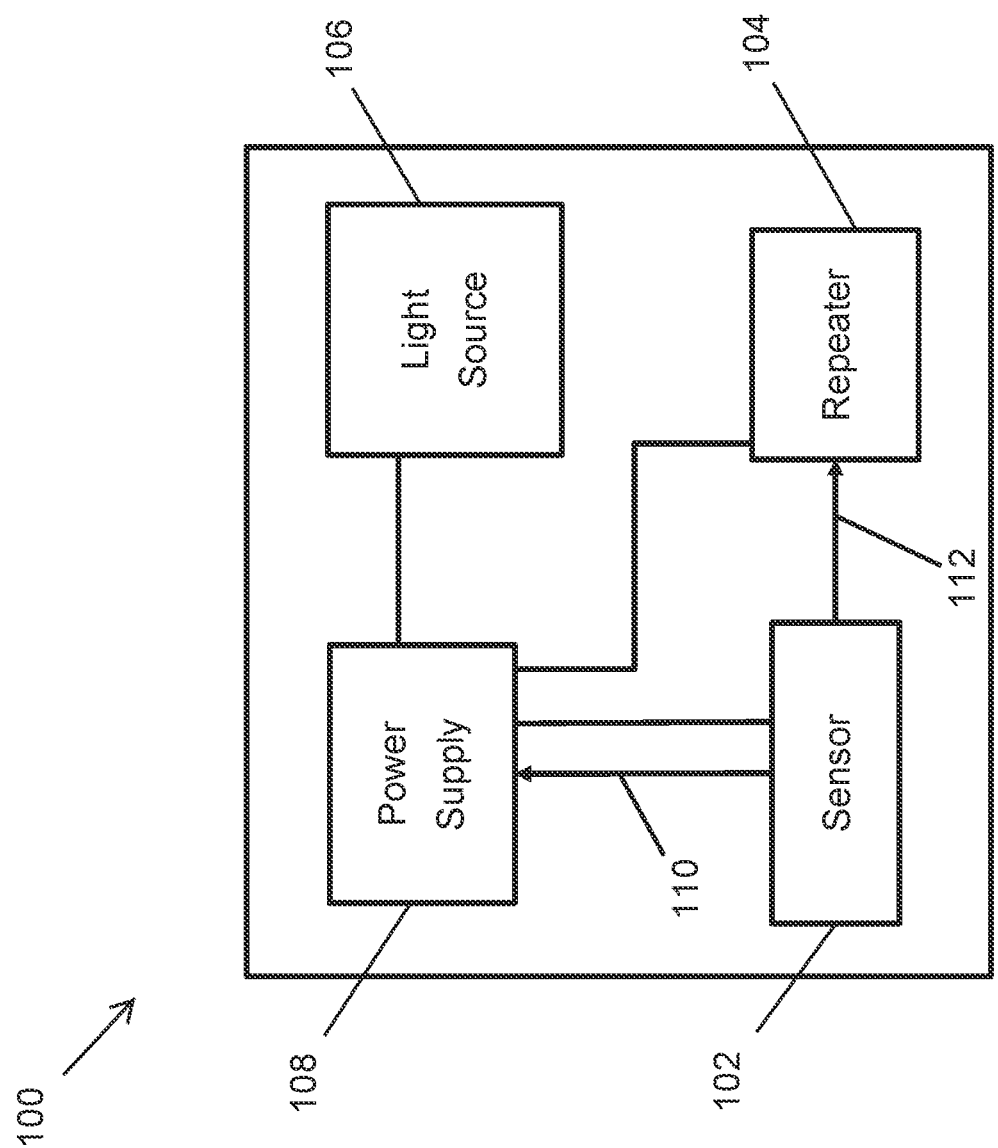
FIG. 1 illustrates a lighting fixture with an integrated occupancy sensor and a wireless signal repeater according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals that are used in different figures designate like or corresponding but not necessarily identical elements.

DETAILED DESCRIPTION OF THE EXAMPLE EMBODIMENTS

In the following paragraphs, example embodiments will be described in further detail by way of example with reference to the figures. In the description, well known components, methods, and/or processing techniques are omitted or briefly described. Furthermore, reference to various feature(s) of the example embodiments is not to suggest that all embodiments must include the referenced feature(s).

In some example embodiments, wireless network coverage, such as Wi-Fi network coverage, may be optimized by dynamically controlling signal repeating operations of a wireless signal repeater depending on whether a space is occupied, and in some cases based on the level of occupancy. For example, if no occupants are detected in a given space, signal repeating operations by the wireless signal repeater may be turned off by turning off power to the wireless signal repeater or by adjusting the signal power levels of transmitted signal. By limiting the transmission of wireless network signals at normal power levels to times when a space is occupied by one or more occupants, unnecessary bandwidth allocations as well as exposures to network security risks may be reduced.

Turning now to the figures, example embodiments are described. FIG. 1 illustrates a lighting fixture 100 with integrated occupancy sensor 102 and wireless signal repeater 104 according to an example embodiment. The lighting fixture 100 may be a recessed luminaire, a suspended luminaire, or another type of luminaire. In some example embodiments, the lighting fixture 100 includes a light source 106 (e.g., an LED light source), the sensor 102, and the wireless signal repeater 104. The lighting fixture 100 may also include a power supply 108.

In some example embodiments, the lighting fixture 100 may be located in a space such that the occupancy sensor 102 can determine whether the space is occupied. The occupancy sensor 102 may output occupancy detection information indicating whether the space is occupied. For example, the occupancy detection information may indicate that the space monitored by the occupancy sensor 102 is occupied. Alternatively or in addition, the occupancy detection information may indicate that the space monitored by the occupancy sensor 102 is unoccupied. The occupancy detection information may also indicate the number of occupants in the space. To illustrate, the occupancy sensor 102 may include a processor (e.g., a microcontroller), a controller (e.g., a microcontroller), or another circuit that may process sensing information (e.g., signals, images, sound, etc.) received or captured by the occupancy sensor 102 and output the occupancy detection information. For example, the occupancy sensor 102 may execute software code stored in a memory device to process the sensing information to determine whether the space is occupied. Alternatively, another component or circuit of the lighting fixture 100 may receive sensing information from the occupancy sensor 102 and generate the occupancy detection information. The occupancy detection information may be provided to the wireless signal repeater 104, to the power supply 108, and/or to other components of the lighting fixture 100.

In some example embodiments, the occupancy sensor 102 may include one or more of a passive infrared (PIR) sensor, Bluetooth Low Energy (BLE) sensor, an ultrasonic sensor, a camera sensor, etc. that can detect whether a space (e.g., a room) is occupied. For example, a motion may be considered an indication of one or occupants, and the occupancy sensor 102 may include a motion sensor that may sense a motion within the sensing area of the occupancy sensor 102. The occupancy sensor 102 may be capable of sensing motions within a space, such as a typical living room, bedroom, office, outdoor space (e.g., a patio), etc.

In some example embodiments, the occupancy sensor 102 may detect Bluetooth and/or other wireless signals instead of or in addition to a typical motion sensor. For example, Bluetooth and/or other wireless signals may be considered an indication of one or occupants. To illustrate, the occupancy sensor 102 may include a wireless (radiofrequency) signal receiver, and the sensor 102 may determine whether a space is occupied based on whether a Bluetooth signal and/or another wireless signal is received by the wireless signal receiver at or above a particular power level. For example, the occupancy sensor 102 may determine whether a space is occupied based on whether the occupancy sensor 102 detects one or more BLE signals from one or more mobile devices (e.g., mobile phones). The occupancy sensor 102 may also determine or estimate the number of occupants of the space based on BLE signals received from different sources and provide the occupancy detection information including the number of occupants, for example, to the wireless signal repeater 104.

In some example embodiments, instead of or in addition to detecting motion and/or BLE signals, the occupancy sensor 102 may detect sounds to determine whether a space is occupied. To illustrate, the occupancy sensor 102 may include one or more microphones and may process the audio signals from the one or more microphones to determine whether a sound received by the microphone corresponds to a human voice. The occupancy sensor 102 may detect different sounds including human voices, etc. and may determine whether the space is occupied by one or more people based on sound levels, patterns, frequency, etc. of the sounds. The occupancy sensor 102 may also determine or estimate the number of occupants in the space based on the sounds picked up by the one or more microphones and provide the occupancy detection information including the number of occupants, for example, to the wireless signal repeater 104.

In some example embodiments, the occupancy sensor 102 may include a camera that captures images of a space instead of or in addition to other occupant detection means. The occupancy sensor 102 may process images captured by the camera to determine whether one or more persons are present in the space. For example, the occupancy sensor 102 may execute an image processing software to identify person(s) in one or more still or video images captured by the camera. To illustrate, the occupancy sensor 102 may perform image analysis to identify person(s) based on facial features. The occupancy sensor 102 may also determine or estimate the number of occupants in the space based on the one or more images and provide the occupancy detection information including the number of occupants, for example, to the wireless signal repeater 104.

In some example embodiments, the wireless signal repeater 104 may increase a wireless network coverage by receiving input wireless (radiofrequency) signals and transmitting output wireless (radiofrequency) signals at higher power levels than the power levels of the input wireless signals received by the wireless signal repeater 104. The output wireless signals transmitted by the wireless signal repeater 104 correspond to the received wireless signals as can be readily understood by those of ordinary skill in the art with the benefit of this disclosure. To illustrate, the output wireless signals may be amplified versions of the input wireless signals. For example, the wireless signal repeater 104 may be a Wi-Fi network repeater.

In some example embodiments, the wireless signal repeater 104 may receive wireless signals from a network device (e.g., a wireless router device or an access point device) and transmit output wireless signals corresponding to the received wireless signals at higher power levels. For example, the wireless signal repeater 104 may receive the input wireless signals from a wireless router and transmit the output wireless signals to user devices, such as desktops, laptops, tables, mobile phones, etc. The wireless signal repeater 104 may also receive wireless signals from user devices and transmit corresponding wireless signals to the network device, for example, at a higher power level. In some example embodiments, the wireless signal repeater 104 may transmit and receive wireless signals that are compliant with one or more wireless standards such as one or more Wi-Fi standards (e.g., IEEE 802.11b/g/n/ac).

In some example embodiments, the power supply 108 may receive input power (e.g., AC or DC power) and may provide output power (e.g., DC power) to the sensor 102, the wireless signal repeater 104, and the light source 108. For example, the power supply 108 may be a multichannel power supply that provides power to the sensor 102, to the wireless signal repeater 104, and to the light source 108 via separate power outputs that are coupled to the sensor 102, to the wireless signal repeater 104, and to the light source 108. The power supply 108 may provide power to the sensor 102, the wireless signal repeater 104, and the light source 108 at different voltage levels. For example, the power supply 108 may include an LED driver that provides power to the light source 106 (e.g., an LED light source) at a voltage level compatible with the light source 106 and that is different from the voltage level(s) provided to the sensor 102 and the repeater 104 by the power supply 108. Alternatively, the power supply 108 may have a single power output that is coupled to the light source 106 as well as the sensor 102 and the wireless signal repeater 104. For example, one or more of the sensor 102, the wireless signal repeater 104, and the light source 106 may include circuitry (e.g., a voltage regulator) to generate power at desired power levels from the power received from the power supply 108. In yet other alternative embodiments, external circuits may receive power from the power supply 108 and generate output power at voltage levels compatible with the sensor 102 and the wireless signal repeater 104.

In some example embodiments, the power supply 108 may receive occupancy detection information from the occupancy sensor 102 via an electrical connection 110 (e.g., one or more electrical wires). The power supply 108 may control the power provided by the power supply 108 to the wireless signal repeater 104 and/or the light source 106 based on the occupancy detection information. For example, the power supply 108 may turn off power provided to one or both of the wireless signal repeater 104 and the light source 106 in response to the occupancy detection information indicating that no occupants are detected in the space monitored by the occupancy sensor 102. The power supply 108 may turn off the power immediately upon receiving the indication that the space is unoccupied. Alternatively, the power supply 108 may turn off the power after a wait time (e.g., 5 minutes) following an indication by the occupancy detection information that no occupants are detected. The wireless signal repeater 104 may be powered off and/or may stop transmitting wireless signals to user devices when the power provided to the wireless signal repeater 104 by the power supply 108 is turned off. The light source 106 may also stop emitting a light when the power provided to the light source 106 by the power supply 108 is turned off.

In some alternative embodiments, instead of turning off the power provided to the wireless signal repeater 104 and/or the light source 106, the power supply 108 may reduce the power in response to the occupancy detection information from the occupancy sensor 102 indicating that no occupants are detected in the space monitored by the sensor 102. The power supply 108 may reduce the power immediately upon the indication by the occupancy detection information that no occupants are detected. Alternatively, the power supply 108 may reduce the power after a wait time following the indication by the occupancy detection information that no occupants are detected. In response to the reduced power from power supply 108, the wireless signal repeater 104 may reduce the power level of wireless signals transmitted by the wireless signal repeater 104. Alternatively or in addition, the light provided by the light source 106 may be dimmed as a result of the reduced power from the power supply 108.

In some example embodiments, if the power provided by the power supply 108 to one or both of the wireless signal repeater 104 and the light source 106 is off, the power supply 108 may turn the power on in response to the occupancy detection information indicating the detection of one or more occupants in the space. If the power provided by the power supply 108 was previously reduced, the power supply 108 may increase the power from the reduced level to a normal operation power level in response to the occupancy detection information indicating the detection of one or more occupants in the space.

In some example embodiments, the wireless signal repeater 104 may operate based on the occupancy detection information provided to the wireless signal repeater 104 from the occupancy sensor 102. For example, the wireless signal repeater 104 may receive the occupancy detection information from the occupancy sensor 102 via an electrical connection 112 (e.g., one or more electrical wires). To illustrate, the power supply 108 may provide power to the wireless signal repeater 104 regardless of whether the occupancy detection information indicates that the space monitored by the occupancy sensor 102 is occupied, and the wireless signal repeater 104 may operate based on the occupancy detection information.

In some example embodiments, the wireless signal repeater 104 may receive wireless signals from a network device (e.g., a wireless router device, an access point device, etc.) and may transmit output wireless signals at normal power levels that are higher than the power levels of the received wireless signals. As describe above, the output wireless signals transmitted by the wireless signal repeater 104 correspond to the received wireless signals. The wireless signal repeater 104 may transmit the output wireless signals to user devices at normal operation power levels in response to the occupancy detection information from the occupancy sensor 102 indicating that one or more occupants are detected in the space monitored by the occupancy sensor 102. For example, the wireless signal repeater 104 may increase the power levels of the wireless signals transmitted by the wireless signal repeater 104 from relatively low power levels to the normal operation power levels in response to the occupancy detection information indicating that the space monitored by the occupancy sensor 102 is occupied. If the wireless signal repeater 104 was not transmitting the wireless signals before the occupancy detection information indicates the detection/presence of occupants, the wireless signal repeater 104 may start transmitting the wireless signals at the normal operation power levels in response to the occupancy detection information indicating that the space is occupied.

In some example embodiments, in response to the occupancy detection information indicating that no occupants are detected by the occupancy sensor 102, the wireless signal repeater 104 may transmit wireless signals to user devices at relatively low power levels. To illustrate, the wireless signal repeater 104 may transmit wireless signals to user devices at low power levels such that no user devices can successfully receive the transmitted wireless signals. Alternatively, the wireless signal repeater 104 may transmit the wireless signals to user devices at low power levels such that only user devices that are near (e.g., within 5 feet, 10 feet, etc.) the wireless signal repeater 104 can successfully receive the transmitted wireless signals. The amplification gain of one or more output amplifiers of the wireless signal repeater 104 may be controlled to reduce the power levels of the wireless signals transmitted by the wireless signal repeater 104. The wireless signal repeater 104 may transmit wireless signals at low power levels immediately or after waiting a wait time following the indication by the sensor 102 that the space monitored by the occupancy sensor 102 is unoccupied.

In some example embodiments, instead of transmitting the wireless signals at lower power levels, the wireless signal repeater 104 may disable the transmission of the wireless signals to user devices in response to the occupancy detection information provided to the wireless signal repeater 104 indicating that the space monitored by the sensor 102 is unoccupied (i.e., no occupants are detected by the occupancy sensor 102). For example, the wireless signal repeater 104 may disable its transmission of wireless signals immediately or following a wait time after the occupancy detection information indicates that the space is unoccupied. The wireless signal repeater 104 may subsequently start transmitting the wireless signals to user devices in response to the occupancy detection information from the sensor 102 indicating that the space monitored by the sensor 102 is occupied.

In some example embodiments, the wireless signal repeater 104 can scan wireless signal channels to identify channels that are free or less crowded. For example, upon the occupancy detection information from the sensor 102 indicating that the monitored space is occupied, the wireless signal repeater 104 may scan wireless signal channels (e.g., Wi-Fi channels) to identify free or less crowded channels and may use one or more of the free or less crowded channels to transmit the wireless signals to user devices, such as laptops, tables, mobile phones, etc.

In some example embodiments, in response to the occupancy detection information indicating that multiple occupants are present in the monitored space, the wireless signal repeater 104 may transmit wireless signals to different user devices using different channels. In response to the occupancy detection information indicating the number of occupants in the monitored space, the wireless signal repeater 104 may transmit wireless signals to different user devices using different channels. The presence of multiple occupants or the number of occupants may be determined or estimated by the occupancy sensor 102 in a number of ways including by using multiple sensor elements of the occupancy sensor 102 that provide sensor information, by identifying BLE signals from different sources, image analysis, audio analysis, and/or other means as can be contemplated by those of ordinary skill in the art with the benefit of this disclosure.

In some example embodiments, one or more user profiles may be stored in the lighting fixture 100. For example, a user profile may include a BLE signature that can be compared against a BLE signature in BLE signals received by the occupancy sensor 102 and/or by the wireless signal repeater 104 of the lighting fixture 100. The BLE signature may include, for example, a device ID of a user device associated with a particular person. To illustrate, the occupancy sensor 102 may indicate that an occupant is detected based on a BLE signal only if the BLE signature in the received BLE signal matches a BLE signature in user profiles stored in the lighting fixture 100 (e.g., a memory device of the lighting fixture 100). Alternatively, the occupancy sensor 102 may not indicate that an occupant is detected if the BLE signature in the received BLE signal matches a BLE signature in user profiles stored in the lighting fixture 100 (e.g., a memory device of the lighting fixture 100).

In some alternative embodiments, the occupancy sensor 102 may detect occupancy based on motion, BLE signals, sound, image analysis, etc. independent of BLE signature. For example, the wireless signal repeater 104 may determine whether to extend the wireless network based on whether the BLE signature in BLE signals received by the occupancy sensor 102 or another receive of the lighting fixture 100 matches a BLE signature in user profiles stored in the lighting fixture 100.

In some example embodiments, the user profile may include facial features and/or other identifying information associated with one or more users. For example, one or more images captured by the occupancy sensor 102 may be analyzed by the occupancy sensor 102 or another component of the lighting fixture 100 to determine whether a person in the images is associated with a user profile. The occupancy sensor 102 may indicate that an occupant is detected if the person in the images is associated with the user profile. Alternatively, the occupancy sensor 102 may not indicate that an occupant is detected if the person in the images is associated with the user profile.

In some example embodiments, the wireless signal repeater 104 may extend the wireless network coverage such that only user devices associated user profiles stored in the lighting fixture 100 can use the extended network. For example, the user profiles may include information that include network or another identification, and the wireless signal repeater 104 transmit output wireless signals related to the particular identification information. Alternatively, the wireless signal repeater 104 may extend the wireless network coverage to all user devices if one user device that is associated with a stored user profile is detected.

In some example embodiments, some user profiles stored in the lighting fixture 100 may include bandwidth information (e.g., data rate, etc.). For example, different users may be allocated different bandwidths in the user profiles. To illustrate, the wireless signal repeater 104 may transmit wireless signals related to some user devices at a higher data rate than other devices based on data rate allocation and/or data rate priority information in the stored user profiles.

In some example embodiments, the wireless signal repeater 104 may be configured to extend the wireless network coverage by transmitting output wireless signals at normal power levels (i.e., higher than power levels of input wireless signals) during particular time periods. To illustrate, the wireless signal repeater 104 may not extend the wireless network coverage outside of certain time periods (e.g., 8 a.m. to 5 p.m.) even if occupants are detected by the occupancy sensor 102. For example, the wireless signal repeater 104 may be configured to extend the wireless network coverage during particular time periods regardless of whether one or more occupants are detected. Alternatively, the wireless signal repeater 104 may be configured to extend the wireless network coverage during particular time periods only if one or more occupants are detected. In some alternative embodiments, the wireless signal repeater 104 may be configured to not extend the wireless network coverage during particular time periods even if occupants are detected.

By disabling the transmission of wireless signals to user devices and/or by transmitting wireless signals to user devices at low power when a monitored space is unoccupied, signal interference may be reduced and the availability of bandwidth may be increased for other user devices of a wireless network. When the wireless signal repeater 104 is used for expanding a wireless network coverage to a limited space, such as a living room, a bedroom, an office space, etc., the wireless signal repeater 104 can transmit signals to user devices at relatively lower normal operation power than typical wireless signal repeaters that are intended to expand network coverage to large areas such as multiple rooms or a large room.

In some alternative embodiments, the lighting fixture 100 may include more than one occupancy sensor 102 and/or more than one wireless signal repeater 104 without departing from the scope of this disclosure. In some example embodiments, the lighting fixture 100 may include components other than shown without departing from the scope of this disclosure. In some example embodiments, one or more the components of the lighting fixture 100 may be integrated into a single component. For example, the sensor 102 and the repeater 104 may be integrated into a single component. In some example embodiments, the lighting fixture 100 may include more than one power supply that may provide power to different components of the lighting fixture 100.

Figure 2:
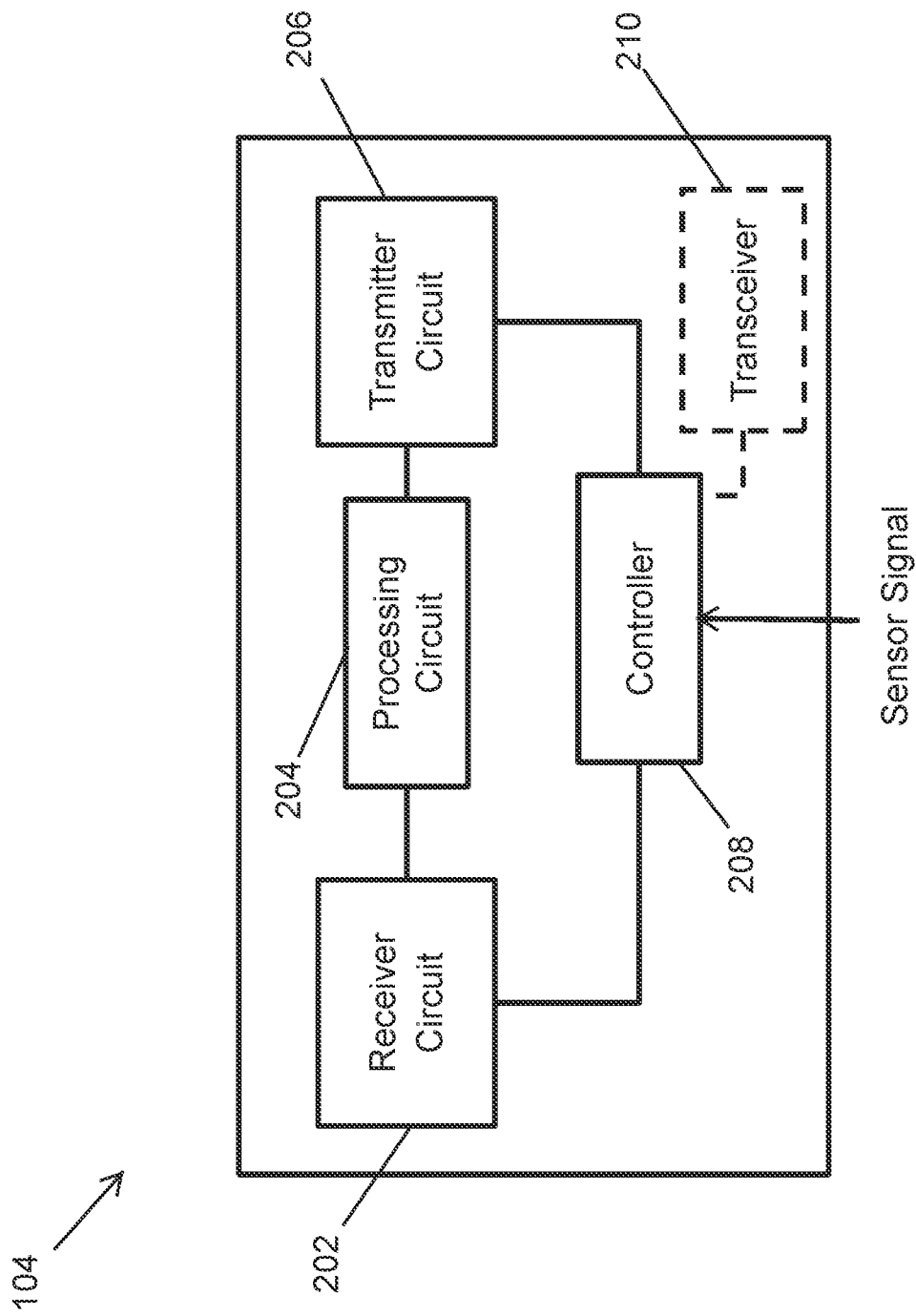
FIG. 2 illustrates a block diagram of the wireless signal repeater of FIG. 1 according to an example embodiment.

FIG. 2 illustrates a block diagram of the wireless signal repeater 104 of FIG. 1 according to an example embodiment. Referring to FIGS. 1 and 2, in some example embodiments, the wireless signal repeater 104 may include a receiver circuit 202, a processing circuit 204, and a transmitter circuit 206. The wireless signal repeater 104 may also include a controller circuit 208 and an optional transceiver 210. The processing circuit 204 and controller circuit 208 may each include a microprocessor and/or a microcontroller, a memory device, etc. and may execute a software code to implement some of the operations described herein.

In some example embodiments, the receiver circuit 202 may include one or more wireless signal receivers that receive wireless signals from a network device, such as a router, an access point, etc. The receiver circuit 202 may also include one or more wireless signal receivers that receive wireless signals from user devices, such as desktops, laptops, tablets, mobile phones, etc. The receiver circuit 202 may include one or more antennas and other components that enable successful reception of wireless signals by the wireless signal repeater 104. After receiving the wireless signals, the receiver circuit 202 may provide the received signals to the processing circuit 204.

In some example embodiments, the processing circuit 204 may process (e.g., filter, change frequencies, etc.) the received signals provided from the receiver circuit 202 and provide output signals to the transmitter circuit 206. The transmitter circuit 206 may include one or more transmitters that transmit wireless signals to user devices and to a network device, where the transmitted wireless signals correspond to the wireless signals received by the receiver circuit 202 as can be readily understood by those of ordinary skill in the art with the benefit of this disclosure.

In some example embodiments, the controller circuit 208 may control operations of the receiver circuit 202 and/or the transmitter circuit 206. To illustrate, the controller circuit 208 may control the transmitter circuit 206 such that the transmitter circuit 206 transmits wireless signals at low power levels in response to the occupancy detection information indicating that no occupants are detected. For example, the controller device 208 may control the gain of one or more output amplifiers of the transmitter circuit 208 based on the occupancy detection information to control the power levels of the wireless signals transmitted by the transmitter circuit 208. The controller circuit 208 may also control the transmitter circuit 206 such that the transmitter circuit 206 transmits wireless signals at normal operating power levels in response to the occupancy detection information indicating that occupants are detected.

In some example embodiments, the controller circuit 208 may control the transmitter circuit 206 based on the occupancy detection information to turn on and off transmissions of wireless signals. For example, the controller circuit 208 may control the gain of one or more output amplifiers of the transmitter circuit 208 to turn on and off transmissions of wireless signals. As another example, the controller circuit 208 may control the power provided to the transmitter circuit 208 or to a portion of the transmitter circuit 208 to turn on and off transmissions of wireless signals.

In some example embodiments, the occupancy detection information may be provided to the controller circuit 208 via the sensor signal input of the wireless signal repeater 104. For example, the sensor signal input may be electrically coupled to the occupancy sensor 102. Alternatively or in addition, the controller circuit 208 may receive the occupancy detection information from the transceiver 210, for example, in embodiments of the wireless signal repeater 104 that include the transceiver 210. For example, the transceiver 210 may wirelessly receive the occupancy detection information from an occupancy sensor that is external to the lighting fixture 100.

In some example embodiments, the controller circuit 208 may scan for free and/or less crowded network channels by processing signals received via the receiver circuit 202 and/or via the transceiver 210. For example, upon the occupancy detection information from the sensor 102 indicating that a monitored space is occupied, the controller circuit 208 may process signals received via the receiver circuit 202 and/or via the transceiver 210 to identify free and/or less crowded network channels (e.g., Wi-Fi network channels). Upon identifying free and/or less crowded channels, the controller circuit 208 may control the transmitter circuit 206 to transmit wireless signals to user devices in the identified free and/or less crowded channels.

In some alternative embodiments, the wireless signal repeater 104 may include more or fewer components than shown in FIG. 2 without departing from the scope of this disclosure. In some alternative embodiments, some components of the wireless signal repeater 104 may be integrated into a single component without departing from the scope of this disclosure. For example, the receiver circuit 202 and the transmitter circuit 206 may be integrated into a transceiver. In some alternative embodiments, the wireless signal repeater 104 may be implemented using different components than shown in FIG. 2 without departing from the scope of this disclosure.

Figure 3:
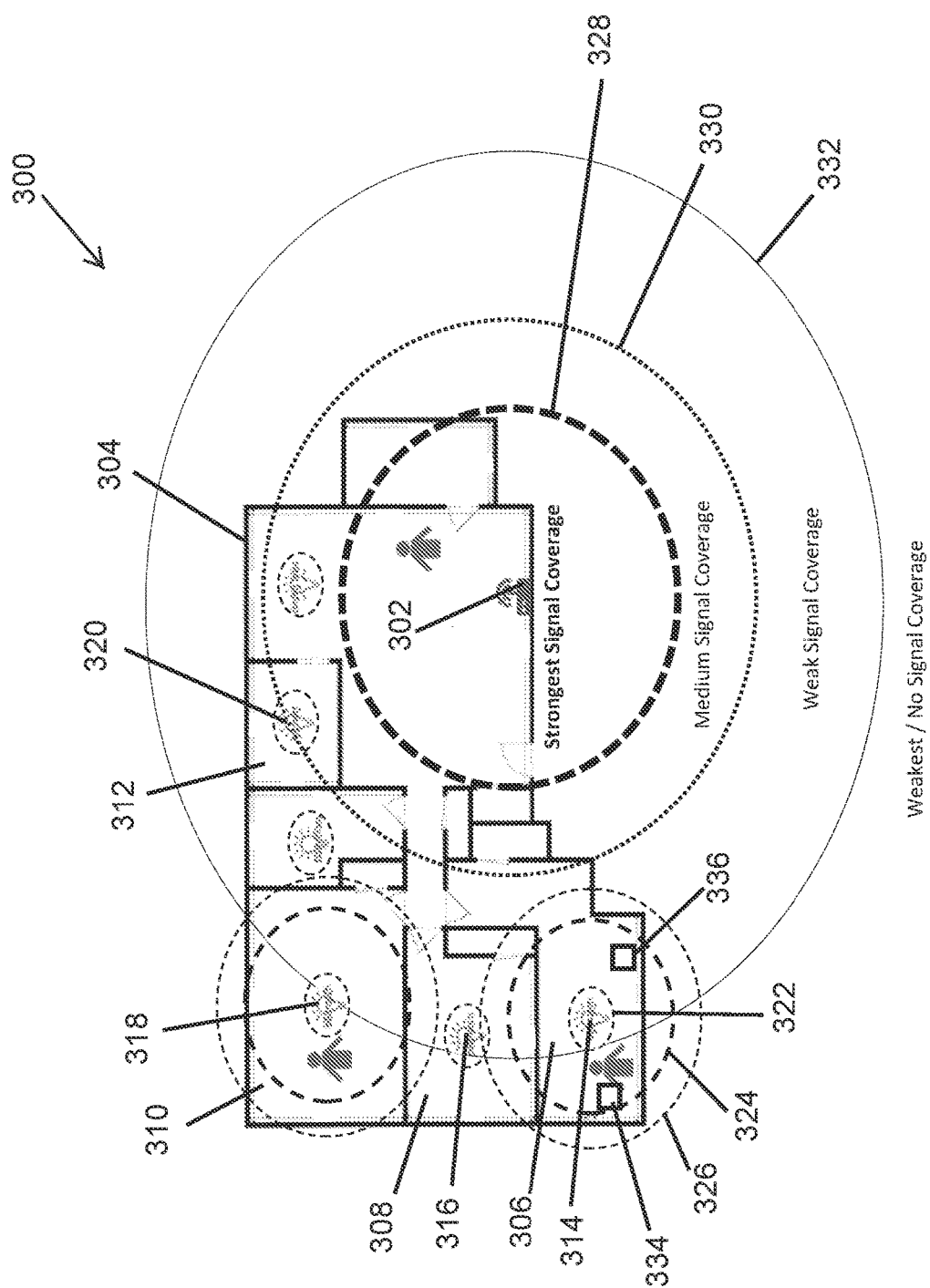
FIG. 3 illustrates a sensor-based lighting and repeater system according to an example embodiment.

FIG. 3 illustrates a sensor-based lighting and repeater system 300 according to an example embodiment. Referring to FIGS. 1-3, in some example embodiments, the system 300 is installed in a building 304 that includes a network device 302 (e.g., a wireless router or an access point). For example, the building 304 may include multiple rooms including rooms 306,308,310, and 312 that contain a respective lighting fixture 314,316,318, and 320. For example, the lighting fixture 314-320 may each correspond to the lighting fixture 100 of FIG. 1 and thus, may include the wireless signal repeater 104.

In some example embodiments, each lighting fixture 314-320 may extend the network coverage of wireless signals transmitted by the network device 302. For example, the network device 302 may be located in a different room from the lighting fixtures 314-320, and the wireless signals transmitted by the network device 302 may be too weak to provide adequate network coverage to all areas of some of the room 306-312. To illustrate, the wireless signals transmitted by the network device 302 may provide the strongest network coverage within the area bound by the dotted line 328, a medium network coverage within the area between dotted lines 328 and 330, and a weak network coverage within the area between dotted line 330 and the solid line 332.

In some example embodiments, the wireless signal repeater 104 of each lighting fixture 314-320 may transmit wireless signals to user devices at relatively low power levels when the respective room is unoccupied. For example, when the occupancy detection information from the occupancy sensor 102 of the lighting fixture 314 indicates that the room 306 is unoccupied, the wireless signal repeater 104 of the lighting fixture 314 may transmit wireless signals at a relatively low power level. To illustrate, the network coverage provided by the low power wireless signals transmitted by the wireless signal repeater 104 of the lighting fixture 314 may be generally confined to the dotted circle 322 when the room 306 is unoccupied.

In some example embodiments, the wireless signal repeater 104 of each lighting fixture 314-320 may transmit wireless signals to user devices at normal operation power levels when the respective room is occupied as indicated by the occupancy detection information from the respective occupancy sensor 102. For example, when the occupancy detection information from the occupancy sensor 102 of the lighting fixture 314 indicates that the room 306 is occupied, the wireless signal repeater 104 of the lighting fixture 314 may transmit wireless signals at normal operation power levels that allow user devices in the room 306 to communicate wirelessly with the network device 302 through the wireless signal repeater 104 of the lighting fixture 314. For example, the strongest network coverage provided by the wireless signals transmitted by the wireless signal repeater 104 of the lighting fixture 314 may be confined to the dotted circle 324, and the network coverage provided by these wireless signals may be weak outside of the dotted circle 326.

In some example embodiments, the other lighting fixtures 316-320 operate in a similar manner as the lighting fixture 314 to expand the network coverage of the wireless signals transmitted by the network device 302 based on whether the respective room/area is occupied. In some example embodiments, some of the lighting fixtures 314-320 may be nodes within a wifeless mesh network. To illustrate, the lighting fixtures 314-320 may receive wireless signals from the network device 302, from another one of the lighting fixtures lighting fixtures 314-320, and/or from a user device (e.g., a user device 334, such as a laptop, a mobile phone, etc.) and transmit output wireless signals at a higher power to another one of the lighting fixtures 314-320. For example, the lighting fixture 316 may receive input wireless signals from the lighting fixture 314 and transmit, at a higher power, output wireless signals generated from the input wireless signals if one or more occupants are detected by the occupancy sensor 102 of the particular lighting fixture 316. The output wireless signals transmitted by the lighting fixture 106 may be received by the lighting fixture 318, and the lighting fixture 108 may transmit respective wireless output signals generated from the received signals if one or more occupants are detected by the occupancy sensor 102 of the particular lighting fixture 318.

In some example embodiments, one or more of the lighting fixtures 314-320 may allocate a bandwidth to a particular user device (e.g., the user device 334) based on a user profile stored in the respective lighting fixture 314-320 in a similar manner as described with respect to FIG. 1. In some example embodiments, one or more of the lighting fixtures 314-320 may also control network access through the respective wireless signal repeater 104. For example, the respective wireless signal repeater 104 of the lighting fixtures 314-320 may be configured to block access from and/or to some network addresses and/or internet addresses. The wireless signal repeater 104 of one or more of the lighting fixtures 314-320 may also control routing within the network (e.g., from user device to another user device, a printer, etc.) based on occupancy detection by the occupancy sensor 102 of the respective one or more of the lighting fixtures 314-320. For example, the wireless signal repeater 104 of the lighting fixture 314 may router wireless signals between the user device 334 (e.g., a laptop) and a user device 336 (e.g., a printer) if one or more occupants are detected in the room 306. In general, the wireless signal repeater 104 of one or more of the lighting fixtures 314-320 may operate as a network router (e.g., a Wi-Fi router) that operates based on whether one or more occupants are detected a respective monitored space.

Because the lighting fixtures 314-320 are distributed through the building 304, the individual wireless signal repeaters of the lighting fixtures 314-320 can transmit wireless signals at high enough power levels to expand the network coverage to the respective areas. By controlling the transmission of wireless signals based on whether the respective rooms/areas are occupied, the wireless signal repeaters of the lighting fixtures 314-320 can avoid wasting power while reducing the risk of interference and network overcrowding. Further, by expanding the network coverage to relatively smaller areas, network security risks may be reduced.

In some alternative embodiments, the system 300 may include more or fewer lighting fixtures than shown without departing from the scope of this disclosure. In some alternative embodiments, the components of the system 300 may be located in a different configuration than shown without departing from the scope of this disclosure. In some alternative embodiments, the network coverage areas of the system 300 may be different from those shown in FIG. 3. In some alternative embodiments, the system 300 may be located in a different floor plan building than shown without departing from the scope of this disclosure.

Figure 4:
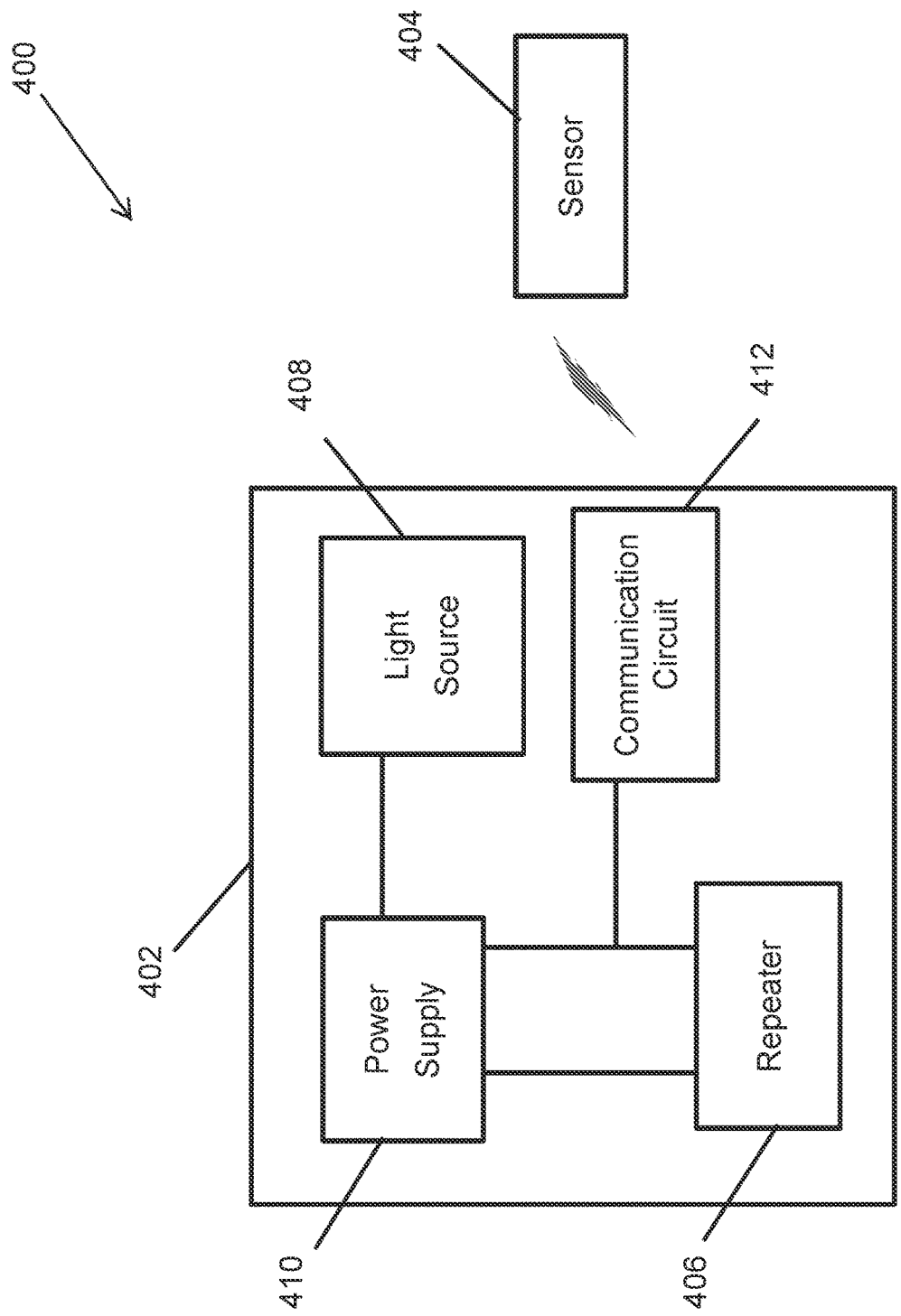
FIG. 4 illustrates a sensor-based lighting and repeater system according to an example embodiment.

FIG. 4 illustrates a sensor-based lighting and repeater system 400 according to an example embodiment. In some example embodiments, the system 400 may include a lighting fixture 402 and an occupancy sensor 404. The lighting fixture 402 may include a wireless signal repeater 406, a light source 408 (e.g., an LED light source), and a power supply 410 that may provide power to the wireless signal repeater 406 and to the light source 408 on the same or separate power outputs. For example, the power supply 410 may correspond to the power supply 108 of FIG. 1 and may operate in a similar manner as described above. The light source 408 may correspond to the light source 106 of FIG. 1.

In some example embodiments, the occupancy sensor 404 may be a standalone occupancy sensor that corresponds to the occupancy sensor 102 of FIG. 1. Alternatively, the occupancy sensor 404 may correspond to the occupancy sensor 102 and may be integrated in another device such as another lighting fixture, a wall-mounted switch, a receptacle, a non-lighting device, etc. The occupancy sensor 404 may wirelessly transmit occupancy detection information to the lighting fixture 402. Alternatively, the occupancy sensor 404 may be coupled to the lighting fixture 402 via a wired electrical connection and may transmit the occupancy detection information to the lighting fixture 402 via the wired electrical connection. The occupancy detection information may indicate that the space monitored by the occupancy sensor 404 is occupied.

Alternatively or in addition, the occupancy detection information may indicate that the space monitored by the occupancy sensor 404 is unoccupied. For example, the occupancy sensor 404 may transmit the occupancy detection information to the lighting fixture 402 upon a detection of one or more occupants in the space monitored by the occupancy sensor 404.

In some example embodiments, the lighting fixture 402 may also include a communication circuit 412 that may include a wireless transceiver that receives occupancy detection information from the sensor 404 via wireless signals. The communication circuit 412 may provide the received occupancy detection information to the wireless signal repeater 406 and/or to the power supply 410. In some example embodiments, the communication circuit 412 may be used in lighting control communications, such as to receive lighting control commands that are used to control the lighting provided by the light source 408.

In some example embodiments, the wireless signal repeater 406 may correspond to the wireless signal repeater 104 of FIGS. 1 and 2 and may operate in the same or similar manner as described above. To illustrate, the wireless signal repeater 406 may transmit wireless signals at relatively low power levels or at normal operation power levels depending on whether the occupancy detection information received by the communication circuit 412 indicates the detection of one or more occupants. For example, the wireless signal repeater 406 may stop transmitting wireless signals if the occupancy detection information indicates that no occupants are detected in a similar manner as described with respect to FIGS. 1-3. In some example embodiments, the power provided to at least a portion of the wireless signal repeater 406 may be turned off by the power supply 410 or by the wireless signal repeater 406 if the occupancy detection information indicates that no occupants are detected, or the monitored space is unoccupied.

In some example embodiments, the system 400 may include more than one occupancy sensors that detect occupancy in non-overlapping or partially overlapping detection spaces/areas. For example, the communication circuit 412 may receive occupancy detection information from multiple sensors and provide the respective occupancy detection information to the wireless signal repeater 406. Alternatively or in addition, the system 400 may include multiple occupancy sensors that operate in a similar manner as the occupancy sensor 404. To illustrate, different occupancy sensors may be positioned to detect occupancy in non-overlapping or partially overlapping detection spaces/areas and may provide respective occupancy detection information to the lighting fixture 402. The wireless signal repeater 406 may operate based on the occupancy detection information from the multiple occupancy sensors in a similar manner.

In some example embodiments, the sensor-based lighting and repeater system 400 maybe used in the system 300 of FIG. 3. For example, the system 400 may be used in addition to or instead of one or more of the lighting fixtures of the system 300. In some alternative embodiments, the lighting fixture 402 may include other components. In some alternative embodiments, one or more components of the lighting fixture 402 may be integrated into a single component. For example, the communication circuit 412 may be integrated in the wireless signal repeater 406 or in the power supply 410. In some alternative embodiments, the components of the lighting fixture 402 may be coupled in a different configuration than shown.

Figure 5:
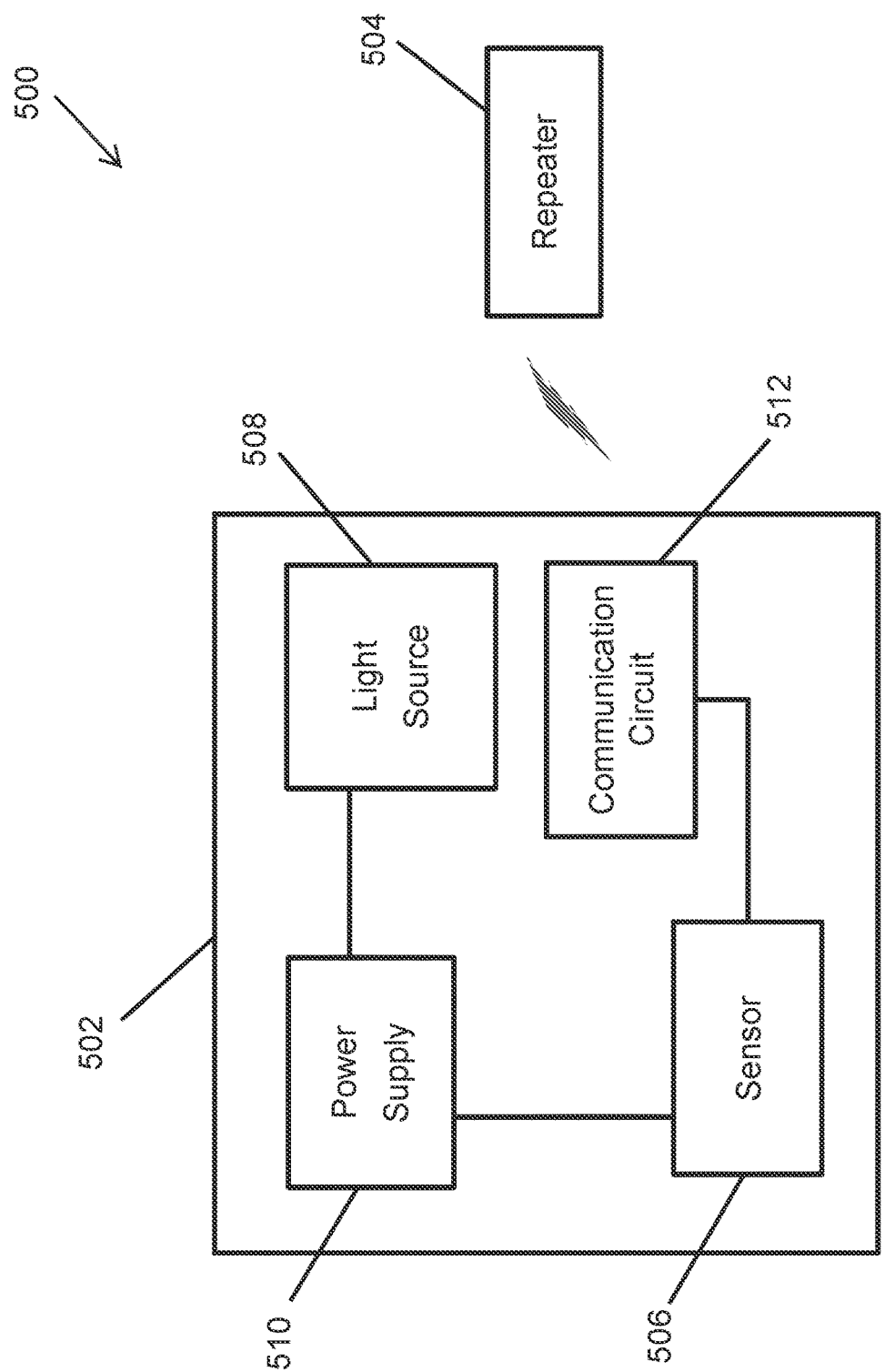
FIG. 5 illustrates a sensor-based lighting and repeater system according to another example embodiment.

FIG. 5 illustrates a sensor-based lighting and repeater system 500 according to another example embodiment. In some example embodiments, the system 500 may include a lighting fixture 502 and a wireless signal repeater 504. The lighting fixture 502 may include an occupancy sensor 506, a light source 508 (e.g., an LED light source), and a power supply 510 that may provide power to the occupancy sensor 506 and to the light source 508 on the same or separate power outputs. For example, the power supply 510 may correspond to the power supply 108, the light source 508 may correspond to the light source 106, and the occupancy sensor 506 may correspond to the occupancy sensor 102 of FIG. 1.

In some example embodiments, the wireless signal repeater 504 may be a standalone wireless signal repeater that corresponds to the wireless signal repeater 104 of FIGS. 1 and 2. Alternatively, wireless signal repeater 504 may be a wireless signal repeater that is integrated in another device such as another lighting fixture, a wall-mounted switch, a receptacle, a non-lighting device, etc. The wireless signal repeater 504 may wirelessly receive occupancy detection information from the lighting fixture 502. Alternatively, the wireless signal repeater 504 may be coupled to the lighting fixture 502 via a wired electrical connection and may receive the occupancy detection information from the lighting fixture 502 via the wired electrical connection. The occupancy detection information may indicate that the space monitored by the occupancy sensor 506 is occupied. Alternatively or in addition, the occupancy detection information may indicate that the space monitored by the occupancy sensor 506 is unoccupied. For example, the occupancy sensor 506 may transmit the occupancy detection information to the lighting fixture 502 upon a detection of one or more occupants in the space monitored by the occupancy sensor 506.

In some example embodiments, the wireless signal repeater 504 may control transmissions of wireless signals by the wireless signal repeater 504 based on the occupancy detection information in a similar manner as described above with respect to FIGS. 1-4. To illustrate, the wireless signal repeater 504 may transmit wireless signals at relatively low power levels or at normal operation power levels depending on whether the occupancy detection information received from the lighting fixture 502 indicates the detection of one or more occupants. For example, the wireless signal repeater 504 may stop transmitting wireless signals to user devices if the occupancy detection information from the lighting fixture 502 does not indicate the detection of occupants or otherwise indicates that the space monitored by the occupancy sensor 506 is unoccupied.

In some example embodiments, the lighting fixture 502 may include a communication circuit 512 that may include a wireless transceiver that wirelessly transmits occupancy detection information from the occupancy sensor 506 to the wireless signal repeater 504. The occupancy sensor 506 may also provide the occupancy detection information to the power supply 510, and the power supply 510 may control the power provided to the light source 508 based on the detection of occupants. In some example embodiments, the communication circuit 512 may be used in lighting control communications, such as to receive lighting control commands that are used to control the lighting provided by the light source 508.

In some example embodiments, the sensor-based lighting and repeater system 500 maybe used in the system 300 of FIG. 3. For example, the system 500 may be used in addition to or instead of one or more of the lighting fixtures of the system 300. In some example embodiments, the system 500 may include additional wireless signal repeater that operate based on the occupancy detection information from the lighting fixture 502. In some alternative embodiments, the lighting fixture 502 may include other components. In some alternative embodiments, one or more components of the lighting fixture 502 may be integrated into a single component. For example, the communication circuit 512 may be integrated in the occupancy sensor 506 or in the power supply 510. In some alternative embodiments, the components of the lighting fixture 502 may be coupled in a different configuration than shown.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

What is claimed is:

1. A sensor based lighting and repeater system, the system comprising:
    an occupancy sensor configured to monitor a space and to output occupancy detection information indicating whether the space is occupied; and
    a lighting fixture, the lighting fixture comprising:
        a wireless signal repeater configured to receive an input wireless signal and to transmit an output wireless signal that corresponds to the input wireless signal; and
        a communication circuit configured to the occupancy detection information from the occupancy sensor and provide the occupancy detection information to the wireless signal repeater;
        wherein the wireless signal repeater is configured to modify a power level of the output wireless signal based on the occupancy detection information.

2. The system of claim 1, wherein the communication circuit is configured to provide the occupancy detection information to a power supply of the lighting fixture, wherein a power provided to the lighting fixture is modified based on the occupancy detection information.

3. The system of claim 1, wherein the lighting fixture comprises a light source, and wherein the communication circuit is configured to receive lighting control commands used to control lighting provided by the light source, and wherein a power to the light source is turned off based on the lighting control commands and if the occupancy detection information indicates that the space is unoccupied and wherein the power is turned on based on the lighting control commands and if the occupancy detection information indicates that the space is occupied.

4. The system of claim 1, wherein the wireless signal repeater is configured to transmit the output wireless signal at a first power level if the occupancy detection information indicates that the space is occupied and wherein the wireless signal repeater is configured to transmit the output wireless signal at a second power level that is less than the first power level if the occupancy detection information indicates that the space is unoccupied.

5. The system of claim 1, wherein the wireless signal repeater is configured to start transmitting the output wireless signal if the occupancy detection information indicates that the space is occupied.

6. The system of claim 1, wherein the wireless signal repeater is configured to stop transmitting the output wireless signal if the occupancy detection information indicates that the space is unoccupied.

7. The system of claim 1, wherein the wireless signal repeater is configured to transmit the output wireless signal if an occupant detected by the occupancy sensor is associated with a user profile stored in the lighting fixture, wherein the wireless signal repeater is configured to transmit the output wireless signal at a bandwidth indicated in the user profile.

8. The system of claim 1, wherein the wireless signal repeater is configured to scan for a free channel or a less crowded channel and wherein the wireless signal repeater is configured to use the free channel or the less crowded channel to transmit the output wireless signal.

9. The system of claim 1, wherein the wireless signal repeater is configured to transmit the output wireless signal during one or more time periods and wherein the wireless signal repeater is configured to not transmit the output wireless signal outside of the one or more time periods.

10. The system of claim 1, wherein the wireless signal repeater is configured to transmit the output wireless signal and a second output wireless signal in different network channels from each other.

11. A sensor based lighting and repeater system, the system comprising:
    a lighting fixture, the lighting fixture comprising:
        a light source that provides an illumination light; and
        an occupancy sensor configured to monitor a space and to output occupancy detection information indicating whether the space is occupied, wherein the light source is configured to operate based on occupancy detection information from the occupancy sensor and wherein the occupancy detection information indicates whether a space monitored by the occupancy sensor is occupied; and
    a wireless signal repeater configured to receive an input wireless signal and to transmit an output wireless signal that corresponds to the input wireless signal, wherein the wireless signal repeater is configured to modify a power level of the output wireless signal based on occupancy detection information from the occupancy sensor that is external to the lighting fixture.

12. The system of claim 11, wherein the wireless signal repeater is configured to transmit the output wireless signal at a first power level if the occupancy detection information indicates that the space is occupied and wherein the wireless signal repeater is configured to transmit the output wireless signal at a second power level that is less than the first power level if the occupancy detection information indicates that the space is unoccupied.

13. The system of claim 11, wherein the wireless signal repeater is configured to start transmitting the output wireless signal if the occupancy detection information indicates that the space is occupied.

14. The system of claim 11, wherein the wireless signal repeater is configured to stop transmitting the output wireless signal if the occupancy detection information indicates that the space is unoccupied.

15. The system of claim 14, wherein the wireless signal repeater is configured to stop transmitting the output wireless signal a wait time after the occupancy detection information indicates that the space is unoccupied.

16. The system of claim 11, wherein the wireless signal repeater is configured to scan for a free channel or a less crowded channel and wherein the wireless signal repeater is configured to use the free channel or the less crowded channel to transmit the output wireless signal.

17. The system of claim 11, wherein the wireless signal repeater is configured to transmit the output wireless signal and a second output wireless signal in different network channels from each other.

18. A method of expanding a coverage of a wireless network, the method comprising:
transmitting, by an occupancy sensor responsive to monitoring a space, occupancy detection information indicating whether the space is occupied; and
receiving, by a communication circuit of a lighting fixture, the occupancy detection information from the occupancy sensor;
transmitting, by the communication circuit, the occupancy detection information to a wireless signal repeater of the lighting fixture;
receiving, by the wireless signal repeater of the lighting fixture, an input wireless signal and the occupancy detection information;
modifying, by the wireless signal repeater, a power level of an output wireless signal based on the occupancy detection information, wherein the output wireless signal corresponds to the input power signal; and
transmitting, by the wireless signal repeater, the modified output wireless signal at the modified power level.

19. The method of claim 18, further comprising scanning for a free channel or a less crowded channel, wherein the wireless signal repeater is configured to use the free channel or the less crowded channel to transmit the output wireless signal.

20. The method of claim 18, further comprising controlling an illumination light provided by a light source of the lighting fixture based on the occupancy detection information.

\* \* \* \* \*